Jan. 21, 1969
M. HURWITZ ET AL
3,423,306
DIELECTROPHORETIC FLUID SEPARATING SYSTEM
Filed May 19, 1965
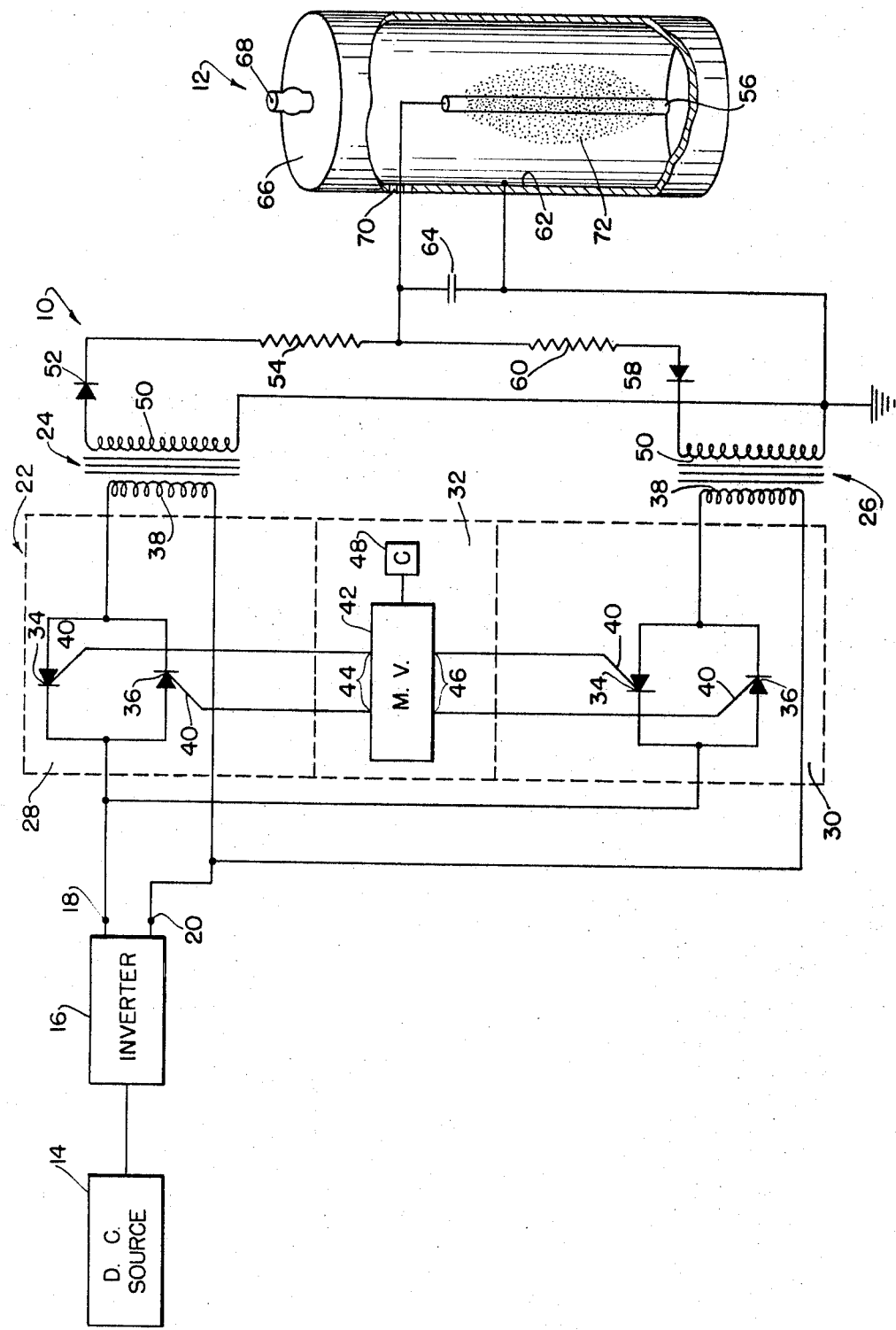

United States Patent Office 3,423,306
Patented Jan. 21, 1969

3,423,306
DIELECTROPHORETIC FLUID
SEPARATING SYSTEM
Mathew Hurwitz, Newton, John M. Reynolds, Concord, and Edward J. Fahimian, Cambridge, Mass., assignors to Dynatech Corporation, Cambridge, Mass.
Filed May 19, 1965, Ser. No. 466,495
U.S. Cl. 204—299        6 Claims
Int. Cl. B01k 5/00; B01d 13/02

ABSTRACT OF THE DISCLOSURE

A dielectrophoretic fluid separating system includes a pair of transformers, each of which has a primary and a secondary winding. An alternating magnetic flux is generated alternately in one and then the other of the secondary windings at a determined frequency so as to produce in each secondary winding an intermittent alternating output voltage. A rectifier is connected to each secondary winding to separately rectify the outputs of the transformers and a dielectrophoretic fluid separator having first and second electrodes is connected to the output of the rectifiers so that the positive going portions of the output of one of the transformers are fed to the separator and the negative going portions of the output of the other of the transformers are fed to the separator so as to apply to the separator an alternating voltage having the determined frequency.

---

This invention relates to a low frequency high voltage power supply and to a dielectrophoretic fluid separating and orienting system incorporating the power supply. It relates more particularly to a relatively compact, lightweight and efficient power supply, especially suited for supplying high voltage to a dielectrophoretic fluid separator at variable, very low frequencies with minimum reactive power losses.

The fluid separating systems with which this invention is concerned take advantage of the dielectrophoretic effect to separate and orient fluid phases by means of an electric field. They have particular application in the handling and tankage of fluids such as liquid oxygen in a zero gravity environment.

Basically, these separators develop a strong, non-uniform electric field in the presence of two or more fluids, such as, for example, a liquid and vapor having different dielectric constants. The electric field polarizes the fluid and attracts the molecules toward the region of strongest field. The attractive force is greater for the liquid since it has the higher dielectric constant. Consequently, the two fluids are separated, with the liquid having the higher dielectric constant being localized in the region of strongest field, and the vapor having the lower dielectric constant being localized adjacent to the liquid. It has been found that due to the finite conductivity present even in dielectric mediums, the applied field must be an alternating one. This is because in the presence of a steady electric field, the finite conductivity results in the eventual appearance of free charges at the fluid interfaces which catastrophically disrupt the interfaces and so upset the stable stratification of the fluids. On the other hand, with an alternating field whose period is short compared with the relaxation time of the fluids, the net accumulation of surface charge at the fluid interfaces is essentially zero. Consequently, if the frequency is high enough, the fluid interfaces will remain essentially charge free and stable.

Given the requirement as aforesaid of a strong alternating electric field, it readily becomes apparent that the dielectrophoretic electrode system presents a large reactive load to a conventional high voltage A.C. power supply. This in turn leads to high current levels in the supply's chokes or transformers, requiring large core mass to handle the increased flux. The large core mass results not only in large iron losses with attendant sacrifice in operating efficiency, but it also considerably increases the overall size and weight of the system. Needless to say, these factors are particularly cirtical in any aerospace applications of such a system. The operating frequency can be lowered to lessen the reactive current, but this alone does not solve the problem. Low frequency operation has in the past required large transformer cores and, in addition, very large filter components have been required to reduce the ripple at such low frequencies.

Accordingly, it is the principal object of this invention to provide a dielectrophoretic fluid separating system which is relatively small and light weight.

A further object of this invention is to provide a dielectric fluid separating system which orients different fluids by application of a strong electric field at selected very low frequencies.

Another object of this invention is to provide a high voltage, variably low frequency power supply for a use in a dielectrophoretic fluid separating system of the above type.

A still further object of this invention is to provide a high voltage, low frequency power supply which has small core mass and overall size.

Another object of this invention is to provide a high voltage low frequency power supply whose output waveform can be shaped as desired.

Still another object of this invention is to provide such a power supply whose output has a low ripple content.

The invention accordingly comprises the features of construction, combination of elements and arrangement of parts which will be exemplified in the construction thereinafter set forth, and the scope of the invention will be indicated in the claims.

For a fuller understanding of the nature of the objects of the invention, reference should be had to the following detailed description taken in connection with the accompanying drawing, which is a diagrammatic representation of our improved dielectrophoretic fluid separating system with portions of a typical fluid separator per se broken away.

Briefly, our improved dielectrophoretic fluid separating system employs a unique high voltage, low frequency power supply for powering a fluid filled dielectrophoretic separator. The power supply is capable of producing the high voltages required to establish the necessary electric fields, typically as high as 30,000 volts/cm. or more, at selected low frequencies, typically ⅒ c.p.s.–¹⁄₁₀₀ c.p.s. thereby minimizing reactive current in the separator and the attendant power losses in the supply. Further its size and weight are far less than prior comparable supplies for use with dielectrophoretic fluid separators.

The power supply employs a pair of step-up transformers connected to a high frequency alternating current source. The source is switched back and forth between the two transformers producing in each transformer secondary an intermittent, high voltage, high frequency output. The transformer outputs are separately rectified, with the output of one rectifier being positive and the other negative. Both outputs are applied to the separator. The separator thus receives a high-voltage output with an alternating waveform, one transformer supplying the positive portions of the waveform and the other transformer supplying the negative portions. The frequency equals the rate of switching between the transformers and thus may be as low as desired.

Referring now to FIG. 1 of the drawing, the improved dielectrophoretic fluid separating system comprises a high-voltage, low-frequency power supply indicated generally at 10 and a dielectrophoretic fluid separator indicated generally at 12.

The power supply 10 includes an available source 14 of direct voltage, on the order of 28 volts, for example. The output of the source 14 is fed to an inverter 16 which converts it to alternating current having a preferably high frequency and moderate voltage, e.g., 2,000 c.p.s., 100 volts. The inverter 16 is preferably one of the solid state variety, capable of delivering on the order of 10 watts for the particular load shown, i.e., the separator 12.

The output of inverter 16, appearing across its terminals 18 and 20, is coupled via a modulating circuit indicated generally at 22 to a pair of step-up transformers 24 and 26. The modulating circuit 22 alternately feeds inverter output to one and then to the other of the transformers 24 and 26.

The modulating circuit 22 comprises more specifically a modulator 28 connected in the primary circuit of transformer 24, a similar modulator 30 connected in the primary circuit of transformer 26 and a modulator controller 32 connected to the modulators 28 and 30. The modulators 28 and 30 function as switches between the inverter 16 and their respective transformers 24 and 26. Their rate of switching is controlled by the modulator controller 32.

Each of the modulators 28 and 30 comprises a pair of silicon controlled rectifiers 34 and 36 connected "back-to-back" in parallel between the output terminal 18 of inverter 16 and one end of the primary winding 38 of the corresponding transformer. The other end of each primary winding 38 is connected directly back to the other terminal 20 of inverter 16. The two rectifiers 34 handle the negative portions of the output of the inverter 16, while the two rectifiers 36 handle the positive portions. Each rectifier includes a gate terminal 40 which is biased by the modulator controller 32 to render the rectifier conducting or nonconducting as will be described presently.

The modulator controller 32 comprises a suitable solid state timing device capable of controlling the modulators 28 and 30 in a time sequence. In the illustrated embodiment of our invention, controller 32 is shown to comprise a free-running multivibrator 42. One output terminal 44 of the multivibrator is connected to the gates 40 of rectifiers 34 and 36 in modulator 28. The other output terminal 46 is connected to the gates 40 of the rectifiers 34 and 36 in modulator 30. As the multivibrator 42 oscillates, a positive signal is applied to the gate 40 of rectifiers 34 and 36 in one modulator, while a negative signal as applied to the gates 40 of the rectifiers 34 and 36 in the other modulator. During the next half-cycle of the multivibrator, the polarities are reversed. The positive bias on a gate 40 is sufficient to cause the corresponding rectifier to conduct, while a negative bias on the gate suffices to cut off the corresponding rectifier. Thus, oscillation of the multivibrator 42 alternately opens and closes the primary circuits of the transformers 24 and 26 so that the alternating signal from inverter 16 is fed first to one and then to the other of transformers 24 and 26. The operating frequency of the multivibrator 42 is controlled by a control 48 which adjusts time constants in the multivibrator.

Each of the transformers 24 and 26 steps up its intermittent 100 volt, 2,000 c.p.s. input to a very high voltage, e.g. 100 kv., which appears across the secondary winding 50 of first one and then the other of transformers. Preferably, the transformers 24 and 26 utilize ferrite cores which, at the 2,000 c.p.s. carrier frequency, reduce core losses to a negligible value.

One end of the secondary winding 50 of transformer 24 is connected via a high voltage rectifier 52 and a series connected resistor 54 to the inner field electrode 56 of separator 12. The corresponding end of secondary winding 50 of transformer 26 is connected by a similar rectifier 58 and series connected resistor 60 to the same field electrode 56. The other end of each winding 50 is connected directly to the outer field electrode 62 of separator 12.

The rectifier 52 is connected to conduct during positive half-cycles from the transformer 24 whereas the rectifier 58 is connected to conduct during negative half-cycles from the transformer 26. As a result, transformer 24 supplies a high-voltage positive pulse each time it is connected to the inverter 16, while transformer 26 supplies high-voltage negative pulse for the duration of each period it is connected to the inverter. Together, they deliver to the separator 12 a high-voltage, alternating current output having substantially square waveform and whose frequency is determined by the setting of control 48 in modulating circuit 22.

The resistors 54 and 60 serve as current limiting resistors by limiting the flow of current from the energized transformer to the deenergized transformer. Also they function together with a shunt capacitor 64 as a filter to minimize A.C. ripple (from the 2,000 cycle carrier) in the output of the power supply.

The dielectrophoretic fluid separator 12 comprises simply a generally cylindrical fluid tight tank on container 66 capable of holding one or more fluids in the liquid or gaseous state. A valved inlet 68 is provided for introducing fluid into the tank 66. If the tank 66 is constructed of a suitable conductive material, it can function itself as the outer field electrode 62 of the separator. The inner field electrode 56 is positioned along the axis of tank 66 and its electrical connection to the power supply 10 is obtained through a suitable fluid tight insulating sleeve 70 in the end wall of the tank 66.

When the high alternating potential from the power supply 10 is applied between the electrodes 56 and 62 of separator 12, a radial, divergent electric field is developed within the container 66. The field is strongest around the inner electrode 56 and grows weaker radially outwardly therefrom. If a fluid is introduced into the container 66 through opening 68, and subjected to the alternating electric field, its molecules will become polarized and migrate toward the region of strongest field (i.e., around the inner electrode 56). By adjusting the control 48 in the power supply 10, one may set the frequency of the field in the separator 12 at a value just high enough to separate the fluids and maintain a stable configuration of the interface between the separated fluids. For example liquid oxygen has a long electrical relaxation time (on the order of $10^3$ to $10^4$ seconds). This enables the system to maintain the fluid in a stable configuration with a field frequency as low as 1/100 c.p.s.

Electrically a typical separator 12 has a relatively high capacitance on the order of $2 \times 10^{-9}$ farad in parallel with a leakage resistance of approximately $10^{10}$ ohms. In the preferred embodiment of our invention, the maximum values of the current limiting resistors 54 and 60 are an order of magnitude lower than the leakage resistance of the separator 12 and also combine with its capacitance to provide a charging time constant for the system of approximately 5% of the period of the alternating current applied to the separator. For the system illustrated here, handling liquid oxygen, the value of the resistances 54 and 60 is of the order of $10^9$ ohms.

If fluids having extremely low boiling points such as liquid hydrogen are used in the system, the shunt capacitor 64 may be replaced by a tuned choke in series with the electrode 56. The choke is immersed in the liquid hydrogen to lower the resistivity of its winding so that its weight power dissipation can be kept to manageable levels.

It should be emphasized at this point that each transformer 24 and 26 operates at the high frequency of the inverter output. Consequently, the small, ferrite core type of transformer is ideal for use in power supply 10. Yet it is important to note also that the power supply has a very low frequency output. As a result, the reactive power in the system is negligable making for further reductions in the size and weight of the reactive components of the power supply.

Further, while modulator 22 functions as a simple on-off switch so that the power supply 10 will deliver a square wave output to separator 12, it will be understood that a different modulator construction may be employed to produce a high voltage, low frequency output having a saw tooth, or step function or other more complicated type of waveform to suit the particular need. Since all switching occurs in the relating low voltage primary circuits of the power supply, transients in its output are kept to a minimum.

Each transformer 24 and 26 may just as well be of the saturable core type having an extra winding connected via a switch to a D.C. source. In this event, the alternating current from inverter 16 is fed to both transformers simultaneously. As the D.C. is switched back and forth between the transformers, the core of one or the other will become saturated thereby inhibiting the inducing of current in the corresponding secondary winding. The result is the same as that described above in connection to the illustrated power supply.

It will be appreciated from the foregoing then that our dielectrophoretic fluid separating system provides the strong alternating electric fields required to separate or orient fluids, yet it is small, light weight and above all efficient. The system obtains very high voltages at very low frequencies with minimum reactive power losses. Its frequency can be varied as necessary to maintain a stable configuration of the fluid being oriented. The power supply employed in our system uses transformers which operate at high frequencies. Accordingly transformers having small core mass of a ferrite material are able to be used. However, very low frequencies are obtained from the power supply by mdoulating the source output prior to feeding it to the transformers. By this procedure any one of a variety of output waveforms can be obtained through employment of a suitable modulator which will shape the output waveform as desired.

It will thus be seen that the objects set forth above, among those apparent from the preceding description, are efficiently attained and, since certain changes may be made in the above construction without departing from the scope of the invention, it is intended that all matter contained in the above description or shown in the accompanying drawing shal be interpreted as illustrative and not in a limiting sense.

It is also to be understood that the following claims are intended to cover all the generic and specific features of the invention herein described, and all statements of the scope of the invention which, as a matter of language, might be said to fall therebetween.

We claim:

1. A dielectrophoretic fluid separating system comprising
   (A) a pair of transformers,
   (1) each of said transformers having primary and second windings,
   (B) means for generating an alternating magnetic flux alternately in one and then the other of said secondary windings at a determined frequency for producing in each of said transformer secondary winding an intermittent alternating output voltage,
   (C) a dielectrophoretic fluid separator having first and second electrodes,
   (D) means connected between said transformer secondary windings and said first and second electrodes for separately rectifying the outputs of said transformers whereby
       (1) the positive going portions of the output of one of said transformers are fed to said separator, and
       (2) the negative going portions of the output of the other of said transformers are fed to said separator,
       (3) thereby to apply to said separator an alternating voltage having said frequency.

2. A separating system as defined in claim 1 wherein said generating means includes
   (A) a low voltage D.C. power supply and
   (B) an inverter connected to said supply,
       said inverter having a high frequency output.

3. A separating system as defined in claim 1 wherein said generating means comprises also
   (A) a first pair of silicon controlled rectifiers reversely connected in parallel between a D.C. voltage source and the primary winding of one of said transformers,
   (B) a second pair of silicon controlled rectifiers reversely connected in parallel between said source and the primary winding of the other of said transformers and
   (C) means for alternately gating said first and second pairs of rectifiers in a timing sequence,
   (D) whereby the output of said source is fed alternately to one and then the other of said transformers in accordance with said timing sequence.

4. A separating system as defined in claim 1 wherein said rectifying means also includes means for filtering out the high frequency component of the output of each of said transformers.

5. A dielectrophoretic fluid separating system comprising,
   (A) an alternating current source having a relatively high output frequency,
   (B) a pair of transformers having primary and secondary windings,
   (C) switch means connected between said source and said transformers,
       (1) said switch means including
           (a) a first pair of silicon controlled rectifiers reversely connected back to back in parallel between said source and said primary winding of one of said transformers,
           (b) a second pair of silicon controlled rectifiers reversely connected back to back in parallel between said source and the primary windings of the other of said transformers,
           (c) means for gating said rectifiers in a timing sequence,
           (d) whereby first one and then the other of said pairs of rectifiers are gated on alternately at a determined relatively low frequency, thereby producing in each of said transformer secondary windings an intermittent high frequency output voltage, and
   (D) an output circuit connected to said transformer secondary windings, said output circuit including
       (1) a first rectifier in series with the secondary winding of said first transformer and passing only the positive going portions of the output of said first transformer, (2) a second rectifier connected in series with the secondary winding of said second transformer and passing only the negative going portions of the output of said second transformer, (3) whereby said output circuit delivers an alternating output voltage having said lower frequency, and (E) a dielectrophoretic fluid separator having first and second electrodes, said electrodes being connected to receive the alternating voltage output from said output circuit.

6. A separating system according to claim 5 wherein said output circuit also includes (A) filters for minimizing the high frequency alternating current component in the output of each of said transformers.

References Cited
UNITED STATES PATENTS

| | | | |
|---|---|---|---|
| 3,287,622 | 11/1966 | Eckenfelder et al. | 321—69 |
| 3,368,962 | 2/1968 | Kramer | 204—299 |
| 3,197,393 | 7/1965 | McEuen | 204—299 |

JOHN H. MACK, *Primary Examiner.*

E. ZAGARELLA, *Assistant Examiner.*

U.S. Cl. X.R.

321—60

UNITED STATES PATENT OFFICE
CERTIFICATE OF CORRECTION

Patent No. 3,423,306           January 21, 1969

Mathew Hurwitz et al.

It is certified that error appears in the above identified patent and that said Letters Patent are hereby corrected as shown below:

Column 2, lines 24 and 25, "dielectric" should read -- dielectrophoretic --. Column 3, line 2, cancel "frequency output. The transformer outputs are separ-". Column 5, line 18, "negligable" should read -- negligible --; line 40, "to" should read -- with --; line 53, "mdoulating" should read -- modulating --; line 64, "shel" should read -- shell --. Column 6, line 2, "second" should read -- secondary --.

Signed and sealed this 8th day of September 1970.

(SEAL)
Attest:

Edward M. Fletcher, Jr.
Attesting Officer

WILLIAM E. SCHUYLER, JR.
Commissioner of Patents